(12) United States Patent
Gaddam et al.

(10) Patent No.: US 12,111,918 B2
(45) Date of Patent: Oct. 8, 2024

(54) MICROSERVICE ADAPTIVE SECURITY HARDENING

(71) Applicant: Visa International Service Association, San Francisco, CA (US)

(72) Inventors: Ajit Gaddam, Foster City, CA (US); Ara Jermakyan, Northridge, CA (US); Pushkar Joglekar, Emeryville, CA (US); Vlad Spichek, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 523 days.

(21) Appl. No.: 17/275,415

(22) PCT Filed: Sep. 18, 2018

(86) PCT No.: PCT/US2018/051481
§ 371 (c)(1),
(2) Date: Mar. 11, 2021

(87) PCT Pub. No.: WO2020/060537
PCT Pub. Date: Mar. 26, 2020

(65) Prior Publication Data
US 2022/0050897 A1 Feb. 17, 2022

(51) Int. Cl.
*G06F 21/55* (2013.01)
(52) U.S. Cl.
CPC ...... *G06F 21/552* (2013.01); *G06F 2221/034* (2013.01)
(58) Field of Classification Search
CPC ............ G06F 21/552; G06F 2221/034
See application file for complete search history.

(56) References Cited

U.S. PATENT DOCUMENTS

| | | |
|---|---|---|
| 9,438,634 B1 | 9/2016 | Ross et al. |
| 2016/0099963 A1* | 4/2016 | Mahaffey ............ H04L 63/166 726/25 |

(Continued)

FOREIGN PATENT DOCUMENTS

WO 2016204903 12/2016

OTHER PUBLICATIONS

Christopher Gerking • David Schubert; Component-Based Refinement and Verification of Information-Flow Security Policies for Cyber-Physical Microservice Architectures; 2019 IEEE International Conference on Software Architecture (ICSA) (2019, pp. 61-70); (Year: 2019).*

(Continued)

*Primary Examiner* — Luu T Pham
*Assistant Examiner* — Chao Wang
(74) *Attorney, Agent, or Firm* — Kilpatrick Townsend & Stockton LLP

(57) ABSTRACT

Methods and systems for evaluating microservice system level activities including system calls and commands, and generating security policies for microservices are disclosed. A microservice agent, operating on a microservice host, can collect system level activity data corresponding to a plurality of microservices operating on the microservice host. The microservice agent can transmit the system level activity data to a microservice evaluator that can use the system level activity data to train machine learning models to identify normal and abnormal microservice system level activities. The normal and abnormal system level activities can be used to generate security policies that can be applied to the microservices. Microservices that perform abnormal system level activities or system level activities that violate security policies can be paused or terminated.

18 Claims, 12 Drawing Sheets

(56) References Cited

U.S. PATENT DOCUMENTS

| | | |
|---|---|---|
| 2017/0116412 A1* | 4/2017 | Stopel .................. G06F 21/577 |
| 2017/0134422 A1 | 5/2017 | Shieh et al. |
| 2017/0237778 A1 | 8/2017 | Digiambattista et al. |
| 2018/0302283 A1* | 10/2018 | Vyas .................. G06F 9/45533 |
| 2020/0019388 A1* | 1/2020 | Jaeger .................. G06F 8/4441 |
| 2020/0034701 A1* | 1/2020 | Ritter .................. G06F 9/5005 |
| 2020/0068440 A1* | 2/2020 | Talbert ................ H04L 41/5009 |

OTHER PUBLICATIONS

Venčkauskas, Algimantas • Kukta, Donatas • Grigaliūnas,Šarūnas • Brūzgienė, Rasa; Enhancing Microservices Security with Token-Based Access Control Method; Sensors (Basel, Switzerland), 23(6), 3363; (Year: 2023).*

Mohsen Ahmadvand • Amjad Ibrahim; Requirements Reconciliation for Scalable and Secure Microservice (De)composition; 2016 IEEE 24th International Requirements Engineering Conference Workshops (REW) (2016, pp. 68-73); (Year: 2016).*

PCT/US2018/051481 , "International Search Report and Written Opinion", Jun. 21, 2019, 14 pages.

* cited by examiner

- `access`: checks if calling process has file access
- `alarm`: sets a process's alarm clock
- `chdir`: changes the working directory
- `chmod`: changes the mode of a file
- `chown`: changes the ownership of a file
- `chroot`: changes the root directory
- `close`: closes a file descriptor
- `dup, dup2`: duplicates an open file descriptor
- `execl, excev, execle, execve, execlp, execvp`: executes a file
- `exit`: exits a process
- `fcntl`: controls open files
- `fork`: creates a new process
- `getpid, petpgrp, getppid`: gets group and process IDs
- `getuid, geteuid, getgid, getegid`: gets user and group IDs
- `ioctl`: controls character devices
- `kill`: sends a signal to one or more processes
- `link`: links a new file name to an existing file
- `lseek`: moves read/write file pointer
- `mknod`: makes a directory, special, or ordinary file
- `mount`: mounts a filesystem
- `msgctl, msgget, msgsnd, msgrcv`: message passing support
- `nice`: changes priority of a process
- `open`: opens a file for reading or writing
- `pause`: suspends a process until a signal occurs
- `pipe`: creates an interprocess pipe
- `plock`: locks a process in memory
- `profil`: requests an execution profile
- `ptrace`: allows a process to trace the execution of another
- `read`: reads from a file
- `semctl, semget, semop`: semaphore support
- `setpgrp`: sets process group ID
- `setuid, setgid`: sets user and group IDs
- `shmctl, shmget, shmop`: shared memory support
- `signal`: control of signal processing
- `sleep`: suspends execution for an interval
- `stat, fstat`: gets file status
- `stime`: sets the time
- `sync`: updates the super block
- `time`: number of seconds since 1/1/1970
- `times`: gets process and child process times
- `ulimit`: gets and sets user limits
- `umask`: gets and sets file creation mask
- `umount`: unmounts a file system
- `uname`: gets system information
- `unlink`: removes directory entry
- `ustat`: gets file system statistics
- `utime`: sets file access and modification times
- `wait`: waits for a child process to stop or terminate
- `write`: writes to a file

*FIG. 2*

```
SYSTEM CALL SECURITY POLICY
           1100
{
    "defaultAction":"SCMP_ACT_ERRNO",
    "syscalls":
    [
        {
            "action":"SCMP_ACT_ALLOW",
            "names":
            [
                "madvise",          "getsocname",
                "mkdir",            "sysinfo",
                "getdents",         "lseek",
                "dup2",             "uname",
                "recvfrom",         "tgkill",
                "gettid",           "sendto",
                "pipe",             "nanosleep",
                "getuid",           "getgroups",
                "set_tid_address","set_robust_list",
                "getrlimit",        "statfs",
                "access",           "exit_group",
                "getegid",          "geteuid",
                "exit",             "poll",
                "wait4",            "clone",
                "rt_sigprocmask",   "getpgrp",
                "rt_sigaction",     "getcwd",
                "brk",              "pselect6",
                "fcntl",            "setsockopt",
                "socket",           "mmap",
                "mprotect",         "ioctl",
                "connect",          "getpeername",
                "open",             "execve",
                "getsockopt",       "openat",
                "writev",           "write",
                "close",            "munmap",
                "read",             "futex",
                "rt_sigreturn",     "getgid",
                "stat",             "fstat",
                "arch_prctl",       "getpid",
                "getppid"
            ]
        }
    ]
}
```

*FIG. 11*

```
                CAPABILITY SECURITY POLICY
                           1200
{
    "add": [],
    "drop":
                    [
                    "SETUID",
                    "SETFCAP",
                    "MKNOD",
                    "SYS_CHROOT",
                    "NET_BIND_SERVICE",
                    "AUDIT_WRITE",
                    "DAC_OVERRIDE",
                    "NET_RAW",
                    "CHOWN",
                    "FSETID",
                    "KILL",
                    "SETGID",
                    "FOWNER",
                    "SETPCAP"
                    ]
}
```

*FIG. 12*

MICROSERVICE ADAPTIVE SECURITY HARDENING

This application is a National Stage of International Application No. PCT/US2018/051481, filed Sep. 18, 2018, of which is herein incorporated by in its entirety

BACKGROUND

In a microservice architecture, software applications are structured as collections of loosely coupled microservices. For the most part, these microservices act independently from one another, and can be developed and maintained by small independent teams. Generally, applications developed using a microservice architecture are easier to understand, develop, test, and deploy than traditional, monolithic applications, motivating the use of microservice architectures in industry and commerce.

However, the use of microservices presents new and formidable computer security problems. Unlike a monolithic application that can be protected using a single security policy, each microservice needs to be protected by a unique security policy, in order to prevent a hacker from compromising any microservice and using it as an entry point to compromise other microservices or a microservice host (e.g., via code injection).

Traditional techniques, such as the use of static security policies determined by human subject matter experts, are difficult to apply to microservice architectures, especially for applications comprising thousands of distinct microservices. Further, because microservices are frequently deployed, modified, re-deployed, and lack static identifiers such as hostnames or IP addresses, it can be difficult to identify a microservice that has been attacked by a hacker. Hackers can potentially execute an attack before a computer security team can detect the attack and take action.

Moreover, microservices can be difficult to develop from a security standpoint. Often microservice developers grant unneeded permissions to microservices, giving the microservice more system access than necessary. These unneeded permissions make it easier for hackers to compromise a microservice host if an individual microservice has been compromised.

Embodiments of the present disclosure address these and other problems, individually and collectively.

SUMMARY

Embodiments of the present disclosure are generally directed to methods and systems for hardening microservice security policies and evaluating characteristics of system level activity data produced by those microservices. This system level activity data can include data regarding the capabilities of a microservice, as well as the system calls or commands made by those microservices, i.e., the quantity, frequency, type, and other characteristics of system calls and commands. Microservices are largely independent units of software that collectively implement a service, for example, a database management microservice, an image rendering microservice, and a network communication microservice may collectively implement a web-based image hosting service. System calls are service requests made by applications (such as microservices) to the kernel of an operating system. Generally, a microservice makes system calls in order to perform its intended function. As an example, a database microservice may make "read" and "write" system calls in order to read data from a memory element (e.g., a hard disk drive) or write data to a memory element. However, an attacker or other malicious user may compromise a microservice and direct it to make system calls for malicious purposes, for example, extracting sensitive data such as cryptographic keys.

Commands are typically entered by entities into a "shell" consisting of an interpreter and a terminal or shell script, and may invoke utilities or compiled programs. "Echo," "test," and "cd" are examples of commands. Like system calls, an attacker or other malicious user may call commands in order to compromise the function of a microservice or a microservice host.

In some systems, capabilities permit certain process behaviors or system level activities. Traditionally, UNIX implementations distinguished between two categories of processes: privileged processes, which bypass all kernel permission checks, and unprivileged processes, which are subject to permission checking based on the process's credentials. Linux systems further divide the privileges associated with privileged processes into distinct "capabilities." The capability "CAP_DAC_OVERRIDE" for example, allows a process to bypass discretionary access control, allowing a process to bypass file read, write, and execution permission checks. Like system calls and commands, an attacker can abuse capabilities in order to attack a microservice host or other system.

A microservice host may operate, execute, or run a collection of microservices. The microservice host may be a server computer that communicates with client computers over a network, such as the Internet. The microservice host may implement a service for client computers, such as a video streaming service, transaction processing service, web-based email service, etc. Each microservice may contribute to implementing the service, for example, for a video streaming service, one microservice may access video files from a database, another microservice may encode the video files, and a third microservice may handle communicating with client computers and transmitting the encoded video files over the Internet.

The microservice host may additionally operate a microservice agent. The microservice agent may observe the operation of different microservices and collect data regarding those microservices. For example, the microservice agent may collect system level activity data regarding the system calls and commands made by each microservice operating on the microservice host. System call data included in this system level activity data may be compiled in an audit log or system call audit log. The microservice agent can transmit the system level activity data to a microservice evaluator for further evaluation. The microservice agent can additionally pause or terminate the operation of microservices that execute abnormal system calls or commands.

The microservice evaluator can use the received system level activity data in order to train machine learning models to identify normal system level activities and abnormal system level activities (e.g., normal system calls and commands and abnormal system calls and commands). The microservice evaluator can train a unique machine learning model for each microservice. Further, the microservice evaluator can use the received system level activity data to generate security policies for each microservice. These security policies can define the capabilities of the microservices, permitted system level activities and non-permitted system level activities, and can be based off of identification of normal system level activities and abnormal system level activities by the machine learning models. Additionally, these security policies can be applied to the microservices in order to prevent them from operating outside their normal operating behavior. Further, the microservice evaluator can periodically evaluate received system level activity data using the trained machine learning models. If the received system level activity data (e.g., system calls and commands) are abnormal, the microservice evaluator can send a control instruction to the microservice agent, indicating that one or more microservices should be paused or terminated.

Additional features of embodiments include co-relating microservices to their microservice images and microservice owners and developers, allowing microservice owners or developers to be quickly identified and informed if a change is made to a security policy. Additionally, systems according to embodiments can generate a default security policy for a new microservice based on an existing security for another similar microservice.

There are numerous advantages to embodiments of the present disclosure. Embodiments improve security scaling by dynamically generating security policies; improve security by removing unneeded security privileges, periodically evaluating system level activity data, and applying machine learning on a per-microservice level; improve efficiency by applying the security policies of similar microservices as the default security policies for new microservices; improve security forensics by automatically pausing or terminating microservices, and improve the transmission of information to stakeholders by automatically identifying and communicating with microservice owners or developers and security teams.

In conventional application security systems, a subject matter expert defines the security policies corresponding to different applications. The subject matter expert relies on their own knowledge of the applications, the system calls and commands they make and their intended functions. However, in microservice architectures, especially ones in large, distributed systems with thousands of microservices, a subject matter expert often does not have the breadth of knowledge required to accurately assess the security needs and generate effective security policies for thousands of microservices. By contrast, embodiments of the present disclosure use machine learning models that can determine which system calls and commands microservices perform during their normal operation, as well as which capabilities are needed. Consequently, embodiments allow the generation of least privileged security policies providing access to only the necessary system calls, commands, and capabilities needed for each microservice to perform their intended function, preventing attackers from hijacking microservices in order to perform malicious functions.

Further, the periodic evaluation of system level activity data using machine learning models adds an additional layer of microservice security. Conventionally, security is accomplished through security policies and forensic analysis. If an attacker manages to evade the security policy, the attacker is free to act maliciously until a security team identifies the attack and updates the security policy. However, embodiments of the present disclosure periodically evaluate system level activity data generated from system level activities performed by a microservice after the hardened security policy is put into place. In the unlikely event that an attacker manages to circumvent the security policy, the microservice evaluator may be able to detect anomalous behavior and signal that the compromised microservice should be paused or terminated.

Also, embodiments provide additional security by performing security hardening and machine learning on a per-microservice basis. Typically, in conventional machine learning systems, a single machine learning model is used to evaluate the behavior of many different applications. However, embodiments use a different machine learning model for each microservice, in order to account for differences between the individual microservices. This leads to better classification of system level activity data, and consequently improves both the generated security policies and the detection of anomalous system level activities.

Additionally, by automatically pausing or terminating microservices in response to the detection of anomalous system level activities, embodiments of the invention improve security forensics and human triaging. Often, in conventional systems, an attacker that manages to bypass security policies is able to act for long periods of time, generating large volumes of forensic data that needs to be analyzed by security teams. Attackers can potentially cover their tracks by performing superfluous system level activities in order to fill up audit logs, making it even more difficult to identify an attack and correct flaws in a security policy. However, because embodiments of the present disclosure pause or terminate microservices once an attack is detected, there is less data for security teams to analyze, and consequently it is easier for security teams to identify the attack and correct the security policy.

Further, by co-relating microservices to their images stored in an image repository and identifying an application owner or developer, embodiments of the present disclosure can quickly inform application owners or developers of any changes to microservice security policies. Further, microservice owners or developers have an opportunity to evaluate or refine security policies before the security policies are deployed.

One embodiment is directed to a method comprising: receiving, by a microservice evaluator, from a microservice host, system level activity data corresponding to a plurality of microservices operating on a microservice host; training, by the microservice evaluator, a plurality of machine learning models corresponding to the plurality of microservices using the system level activity data or a derivative thereof as training data; determining, by the microservice evaluator, using the plurality of machine learning models corresponding to the plurality of microservices and the system level activity data or a derivative thereof as training data; determining, by the microservice evaluator, using the plurality of machine learning models corresponding to the plurality of microservices and the system level activity data, a plurality of sets of normal system level activities and abnormal system level activities; determining, by the microservice evaluator, a plurality of security policies corresponding to the plurality of microservices, wherein each security policy comprises a plurality of permitted system level activities and a plurality of non-permitted system level activities; and providing, by the microservice evaluator, to a microservice orchestrator, the plurality of security policies, wherein the microservice orchestrator applies the plurality of security policies to the plurality of microservices.

Another embodiment is directed to a method comprising: operating, by a microservice host, a plurality of microservices, the plurality of microservices performing a plurality of system level activities including generating a plurality of system calls to an operating system kernel of the microservice host; generating, by the microservice host, system level activity data from the plurality of system level activities; transmitting, by the microservice host, the system level activity data to a microservice evaluator, causing the microservice evaluator to evaluate the system level activity data to identify normal system level activities and abnormal system level activities, and generate a plurality of security policies corresponding to the plurality of microservices; receiving, by the microservice host, the plurality of security policies or a plurality of updated microservice images comprising the plurality of security policies, the plurality of security policies comprising a plurality of permitted system level activities and a plurality of non-permitted system level activities; and allowing permitted system level activities of the plurality of system level activities and preventing non-permitted system level activities of the plurality of system level activities.

Another embodiment is directed to a method comprising: receiving, by a microservice evaluator, from a microservice host, operation data corresponding to a microservice of a plurality of microservices operating on the microservice host; determining, by the microservice evaluator, a machine learning model corresponding to the microservice of a plurality of machine learning models stored on the microservice evaluator; determining, by the microservice evaluator, using the machine learning model and the system level activity data or a derivative thereof, whether the system level activity data corresponds to normal system level activities or abnormal system level activities; if the system level activity data corresponds to normal system level activities, transmitting, by the microservice evaluator, to the microservice host, a first indication that the system level activity data corresponds to normal system level activities; and if the system level activity data corresponds to abnormal system level activities, transmitting, by the microservice evaluator, to the microservice host, a second indication that the system level activity data corresponds to abnormal system level activities, wherein the microservice host pauses or terminates the microservice in response to receiving the second indication.

These and other embodiments of the disclosure are described in detail below. For example, other embodiments are directed to systems, devices and computer readable media associated with methods described herein.

A better understanding of the nature and advantages of embodiments of the present disclosure may be gained with reference to the following detailed description and the accompanying drawings.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

"Entities" may include things with distinct and independent existence. For example, entities may include people, organizations (e.g., partnerships and businesses), computers, and computer networks, among others. An entity can communicate or interact with its environment in some manner. Further, an entity can operate, interface, or interact with a computer or computer network during the course of its existence. An entity may be a malicious entity or "attacker."

A "software container" or "container" may include lightweight, standalone executable software packages. Containers typically take up less memory than virtual machines. A software container may include everything needed to run an application or microservice, including code, system tools, system libraries, and settings. Software containers may be isolated from one another and communicate through well defined channels. Containers may share operating system resources including the kernel. Further, containers may be created from container images that specify their contents.

A "virtual machine" can be an emulation or abstraction of a computer system. Virtual machines may be based off of computer architectures and provide the functionality of a physical computer. A virtual machine may have its own operating system and may be partially or totally isolated from other virtual machines operating on a (non-virtual) server computer. A host system may use a hypervisor to share and manage hardware (e.g., RAM, magnetic disk drive, etc.) between virtual machines.

"Microservices" may include services that operates in a loosely coupled manner with a collection of other microservices in order to implement an application. For example, a video streaming server may provide a video streaming service to client computers using a plurality of microservices, wherein one microservice may provide the user interface front end, another microservice may manage a database of videos, a third microservice may manage video encoding, etc. A "microservice image" may refer to a software container image used to implement a microservice on a host system. The microservice image may include executable files and their software dependencies, which can be executed in order to implement the microservice.

"Metadata" may include data that provides information about other data. Types of metadata include descriptive metadata, structural metadata, administrative metadata, reference metadata and statistical metadata. Metadata may correspond to a microservice, microservice image, or entities associated with the microservice or microservice image.

A "distance metric" may include a measure of the difference or distance between two things. For example, a distance metric may describe the difference between two arrays stored in computer memory. A distance metric may be used to estimate how similar two things are, or conversely how different they are.

"User space" may include code that runs outside of an "operating system kernel." This may include software applications, including software containers and microservices. User space processes typically run in their own virtual memory space and are usually not allowed to access the memory of other processes.

The "kernel" or operating system kernel may include a computer program that can be the core of a computer's operating system. A kernel may have complete control over the operating system, and may handle input/output requests from software applications, memory and input output devices such as keyboards, monitors, printers, and speakers. Applications, containers, and microservices may communicate with the kernel via system calls.

"System level activity data" may include data related to the operation of a process at a system level. As an example, system level activity data may include data related to the operation of a microservice or software container. System level activity data may include system calls or commands made by a process during the operation of that process. System level activity data may also include the capabilities of a process, or the capabilities needed by that process in order to perform its intended function.

A "system call" may include a request by a software application for a service from the operating system kernel. This may include hardware-related services (e.g., reading from the keyboard, accessing a disk drive, etc.), creating and executing new processes, and communicating with kernel services such as process scheduling. Examples of system calls include open (used to open a file) read (used to read data stored at a memory address) write (used to write data at a memory address), and exit (terminating the execution of a computer process), among others.

"System call data" may include data corresponding to a system call. This may include an identifier of the system call (e.g., write) the target or inputs of the system call (such as a directory), the system time when the system call was made, among others. System call data may be compiled in an "audit log" or "security log" that contains records of multiple system calls made over a period of time.

A "command" may include an executable program. A command may be executed from a system shell either directly or indirectly by an entity such as a user. A command may apply some action on input data and generate output data. As an example, a command may be used to generate output data in the form of system or disk files. Commands may have a syntax, such as "verb [options] [arguments]."

"Capabilities" may include sets of privileges given to processes. Capabilities may be independently enabled and disabled for distinct processes, including microservices. Examples of capabilities include "CAP_SETGID," which allows a process to arbitrarily manipulate process GIDs (group identifiers) and supplementary GID lists.

"Security modules" may include software modules used to specify and enforce "security policies." Some examples of security modules include AppArmor and Security-Enhanced Linux (SELinux) for the Linux operating system. A security policy may define what makes a system secure. A security policy may define the capabilities of different process. A security policy may further describe or outline permitted and non-permitted actions or processes, including permitted and non-permitted system calls and commands. A computer system may have numerous security policies. For example, a computer system may have a security policy for each individual application operating in user space, as well as a security policy governing communications over a network.

A "daemon" may include a computer program that runs as a background process. A daemon may be used to audit other computer programs or microservices.

A "microservice host" may include a computer system that hosts or otherwise operates one or more microservices. A microservice host may be a server computer that uses the one or more microservices in order to provide a service to a client computers, such as a video streaming service.

A "microservice orchestrator" may include a computer system that manages the storage and distribution of microservices and microservice images. A microservice orchestrator may be implemented as a "cloud" or distributed computing system, and may be able to push microservice images to microservice hosts or other computer systems. A microservice orchestrator may manage and maintain one or more repositories of microservice images.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, models that classify data by establishing a gap or boundary between inputs of different classifications, as well as neural networks, collections of artificial "neurons" that perform functions by activating in response to inputs.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex input, such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

A "machine learning classifier" may include a machine learning model that can classify input data or feature vectors. For example, an image classifier is a machine learning model that can be used to classify images, such as images of animals. As another example, a news classifier is a machine learning model that can classify news articles as "real news" or "fake news." As a third example, an anomaly detector, such as a credit card fraud detector, can classify input data such as credit card transactions as either normal or anomalous. The output produced by a machine learning classifier may be referred to as "classification data." Machine learning classifiers may also include clustering models, such as K-means clustering. Clustering models can be used to partition input data or feature vectors into multiple clusters. Each cluster may correspond to a particular classification.

For example, a clustering model may accept feature vectors corresponding to the size and weight of dogs, then generate clusters of feature vectors corresponding to small dogs, medium dogs, and large dogs. When new input data is included in a cluster (e.g., the small dogs cluster), the clustering model has effectively classified the new input data as input data corresponding to the cluster.

An "anomaly score" may include a score that indicates how normal or anomalous something is. For example, an anomaly score can indicate how anomalous a set of input data is. Classification data produced by a machine learning model may be an anomaly score. An anomaly score can be within a defined range, such as 0→1, −1→1, or 0→100. An anomaly score can be compared against a threshold in order to make a decision. For example, if an anomaly score exceeds a threshold, a computer can halt or terminate a process associated with the input data that produced the corresponding anomaly score.

BRIEF DESCRIPTION OF THE DRAWINGS

FIG. 2 shows a list of common system calls on UNIX and UNIX-like operating systems.

FIG. 11 shows an exemplary system call security policy according to some embodiments.

FIG. 12 shows an exemplary capability security policy according to some embodiments.

DETAILED DESCRIPTION

Generally, some embodiments of the present disclosure can be understood with regard to two major functions performed by embodiments. The first function is security policy hardening. Security policy hardening may refer to the act of generating a new security policy or updating an existing or default security policy with restricted permissions. In some embodiments, a microservice evaluator may be used to generate security policies corresponding to a number of microservices operating on a microservice host. These security policies may set or establish the capabilities of microservices, as well as list or otherwise indicate permitted system level activities (e.g., system calls and commands) and non-permitted system level activities, and may be enforced with the use of a security module, such as AppArmor or SELinux on Linux based operating systems. Each security policy may correspond to a particular microservice, and the capabilities and permitted and non-permitted system level activities may be different for each microservice. For example, a database management microservice may be broadly permitted to read and write to memory in order to perform its intended functions, while a microservice used to prepare information for transmission over a network may not have the same permission. Security policy hardening improves the security of microservices and microservice host, because it prevents compromised or malicious microservices from executing system calls or commands which could disrupt the operation of the microservice host, or system calls or commands that can leak sensitive information stored on the microservice host, such as cryptographic keys or personally identifying information.

In addition to security policy hardening, embodiments of the invention also provide for the use of machine learning models to evaluate microservice behavior on a per-microservice basis. System level activities made by each microservice can be monitored and logged by a microservice agent operating on the microservice host. The microservice agent can transmit the system level activity data to the microservice evaluator, which can use machine learning models corresponding to each microservice in order to evaluate whether the system level activities performed by that microservice are normal or abnormal. The microservice evaluator can generate anomaly scores corresponding to each operation or to sequences of system level activities, indicating the degree or likelihood that those system level activities are anomalous. For example, an anomaly score of 3 may indicate a 3% probability that an operation is abnormal. The microservice evaluator may transmit these anomaly scores back to the microservice host, and the microservice host may use the microservice agent to pause or terminate microservices that produced anomalous system calls or commands.

Figure 1:
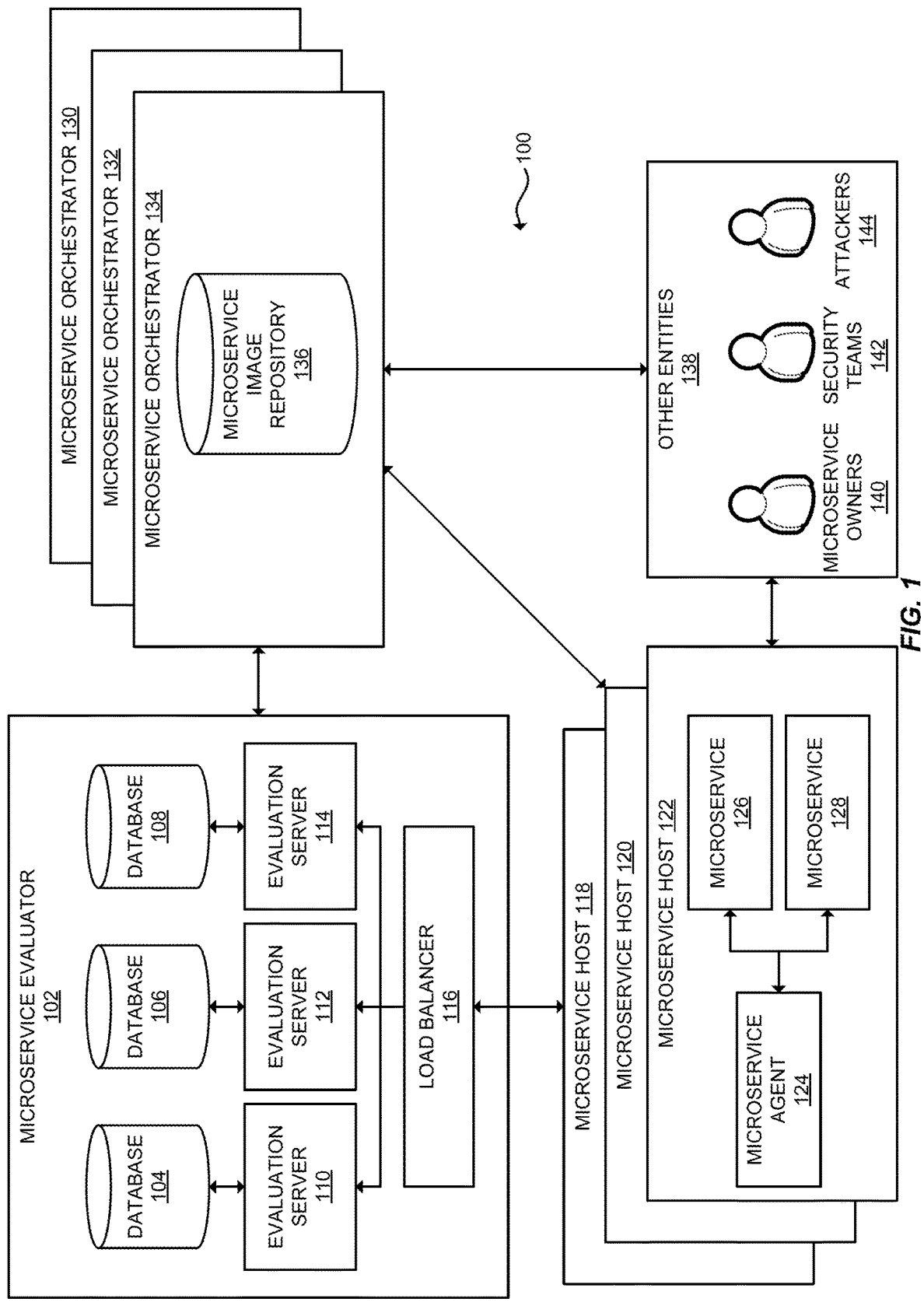
FIG. 1 shows a system for operating, evaluating, and managing microservices according to some embodiments.

FIG. 1 shows a system block diagram of a system 100 according to some embodiments of the invention. The system 100 can be used to manage, utilize, and evaluate microservices operating on microservice hosts. The system 100 may comprise a microservice evaluator 102, microservice hosts 118, 120, and 122, microservice orchestrators 130, 132, and 134, and other entities 138, including microservice owners or developers 140, security teams 142, and attackers 144.

The entities of FIG. 1 can communicate with one another via any appropriate means, including a communications network. Messages and other communications between the entities may be in encrypted or unencrypted form and may be mutually authenticated. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application (Protocol), I-mode, and/or the like); and/or the like. Messages between the devices and computers may be transmitted using a secure communication protocol such as, but not limited to, File Transfer Protocol (FTP); Hypertext Transfer Protocol (HTTP); Secure Hypertext Transfer Protocol (HTTPS), Secure Socket Layer (SSL) and/or the like.

Generally, microservice hosts 118, 120, and 112, operate a plurality of microservices 126 and 128. These microservices can be executed on microservice hosts 118, 120, and 122 in order to provide a service. For example, microservice 126 could be a video encoding microservice and microservice 128 could be a streaming microservice, which collectively are used to stream video to client computers (not shown). System calls made by microservices 126 and 128 can be monitored by microservice agent 124, which can transmit system level activity data to microservice evaluator 102 for evaluation. Additionally, microservice agent 124 can pause or terminate microservices that exhibit abnormal behavior, e.g., microservices that make abnormal or dangerous system calls or commands. Microservices 126 and 128 may be implemented using software containers, virtual machines, or a combination thereof.

Microservices 126 and 128 can be pushed or loaded onto microservice hosts 118, 120, and 122 from microservice orchestrators 130, 132, and 134. The microservice orchestrators may maintain one or more microservice image repositories 136. Microservice image repository 136 may contain microservice images and configuration files used to execute those microservice images on microservice hosts 118, 120, and 122. The microservice image repository 136 may also contain other data records related to the microservice images. For example, microservice image identifiers, or microservice owner identifiers that identify an owner or developer of a given microservice. Microservices 126 and 128 may each have a corresponding security policy. The security policy may indicate the capabilities and permissions associated with the microservice. For example, whether a microservice is able to bypass file read permission checks.

Examples of common system calls on Linux, UNIX or other POSIX compliant operating systems include open, read, write, close, wait, exec, fork, exit, and kill. Other examples of system calls are shown in FIG. 2. While microservices 126 and 128 may use system calls to perform their intended functions (e.g., manage databases, obtain and process user input, etc.), many system calls can be exploited by attackers 144 in order to compromise microservice hosts 118, 120, and 122, and/or steal sensitive data. As an example, an attacker 144 can use a system call to repeatedly call a self-forking process as part of a "fork bomb" denial of service attack. As another example, an attacker 144 can call read in order to access sensitive data stored on a microservice host, such as personally identifying information. Similarly, an attacker can make use of commands or capabilities in order to perform system level activities that may be harmful to a microservice host.

A security policy may be represented as a code or another computer readable file used to indicate the permissions, restrictions, and monitoring behavior associated with a given microservice. For example, the security policy may include lines such as "audit @{HOME}/bin/ rw", indicating that a microservice host or microservice agent should record or otherwise log attempts to read or write (indicated by "rw") to the directory "@{HOME}/bin/". As another example, the security policy may include lines such as "audit deny @{HOME}/.* rw", indicating that the microservice host or microservice agent should deny read and write permission to the directory "@{HOME}/. *", in addition to logging attempts to read or write to directory "@{HOME}/.*".

Security policies may be separated into different files corresponding to allowed system calls, commands, and capabilities. FIG. 11 shows an example of a system call security policy 1100. The system call security policy permits a number of system calls, including, e.g., "mkdir," "lseek," etc. FIG. 12 shows an example of a capability security policy 1200, which indicates to remove or "drop" a list of capabilities, including "DAC_OVERRIDE," "NET_BIND_SERVICES," etc.

Figure 3:
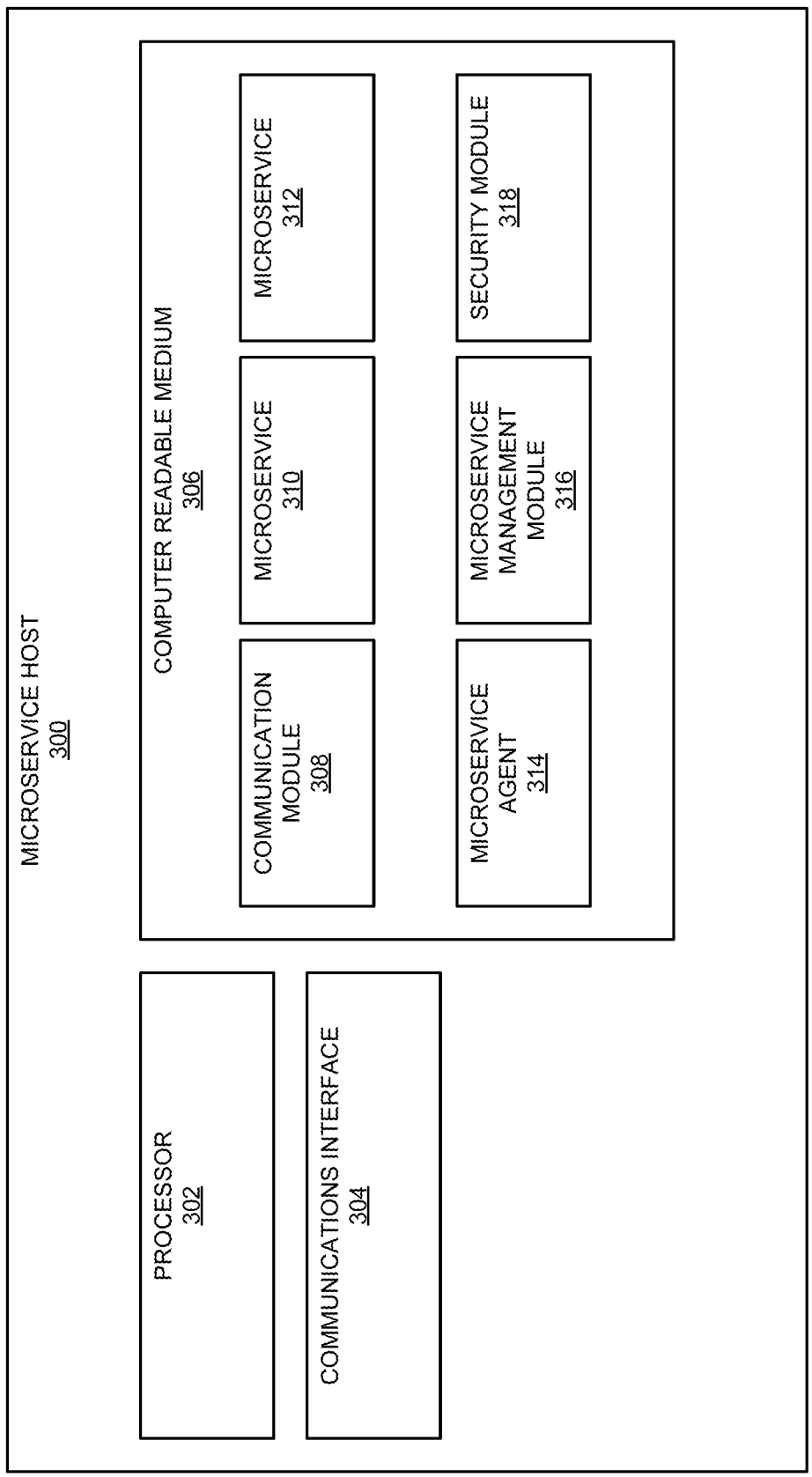
FIG. 3 shows a block diagram of a microservice host according to some embodiments.

Microservice hosts 118, 120, and 122 may be better understood with reference to FIG. 3, which shows a microservice host 300 comprising a processor 302, a communications interface 304, and a computer readable medium 306. The computer readable medium 306 may store software modules including a communication module 308, microservices 310 and 312, microservice agent 314, microservice management module 316, and security module 318.

Processor 302 may be any suitable processing apparatus or device as described in the terms section above. The communications interface 304 may comprise a network interface that enables the microservice host 300 to communicate with other computer or systems over a network such as the Internet.

Communication module 308 may comprise code or software, executable by the processor 302 for establishing communications between the microservice host 300 and other entities, including the microservice evaluator and microservice orchestrators. The microservice host may use the communications module 308 to receive data from the microservice evaluator and microservice orchestrators. This data may include microservice images, security policies, or control instructions, such as instructions to pause or terminate microservices such as microservices 310 and 312. The communication module 308 may enable the microservice agent 314 to transmit system level activity data to a microservice evaluator or another computer system.

Microservices 310 and 312 may include software containers or virtual machines used to implement microservices. These may include, for example, database management microservices, network communication microservices, transaction evaluation microservices, etc. As described in the terms section, microservices 310 and 312 may be isolated from each other and other applications executed by the microservice host 300. Microservices 310 and 312 may communicate through well-defined communication channels and make system calls or issue commands to the operating system of microservice host 300 in order to perform their intended functions. Although two microservices 310 and 312 are shown, embodiments of the present disclosure can be practiced with any number of microservices.

Microservice agent 314 may include a software container or virtual machine used to implement a microservice that audits or otherwise collects data on other microservices, including microservices 310 and 312. Microservice agent 314 may additionally comprise code, executable by the processor 302, for generating system level activity data, including system call audit logs. Microservice agent 314 may additionally pause or terminate the operation of microservices 310 and 312 in response to receiving control instructions or based on anomaly scores received from a microservice evaluator. Further, microservice agent 314 may comprise code enabling the microservice host 300 to transmit system level activity data to the microservice evaluator for processing, as well as any appropriate metadata, such as microservice identifiers.

Microservice management module 316 may comprise software or other code, executable by processor 302 to manage microservices 310, 312, and microservice agent 314. This software may include application programming interfaces, command line interfaces, distribution and orchestration software, container runtime components, microservice supervisors, etc. The microservice management module 316 may allow microservices 310, 312, and 314 to share the operating system kernel of microservice host 300.

Security module 318 may comprise code or software, executable by the processor 302, enabling the use of security policies and other security related functions. Security module 318 may allow system administrators to restrict program capabilities (including microservices 310 and 312) using per-program security policies. These security policies can allow and deny capabilities such as network access, read and write permissions, etc. The security module 318 may provide discretionary access control or mandatory access control. The security module 318 may be included in the microservice host 300 kernel.

Returning to FIG. 1, microservice agent 124 can transmit system level activity data to microservice evaluator 102. Microservice evaluator 102 may comprise a load balancer 116, evaluation servers 110, 112, and 114, and databases 104, 106, and 108. The load balancer 116 may distribute system level activity data to evaluation servers 110, 112, and 114 in order to ensure that the workload of system level activity data evaluation is evenly distributed between the evaluation servers 110, 112, and 114. Databases 104, 106 and 108 may contain machine learning models corresponding to each microservice, training data, and system level activity data that may be used for forensic analysis by security teams 142. Evaluation servers 110, 112, and 114 may train machine learning models, classify system level activity data as normal or abnormal, and generate security policies corresponding to microservices 126 and 128.

Figure 4:
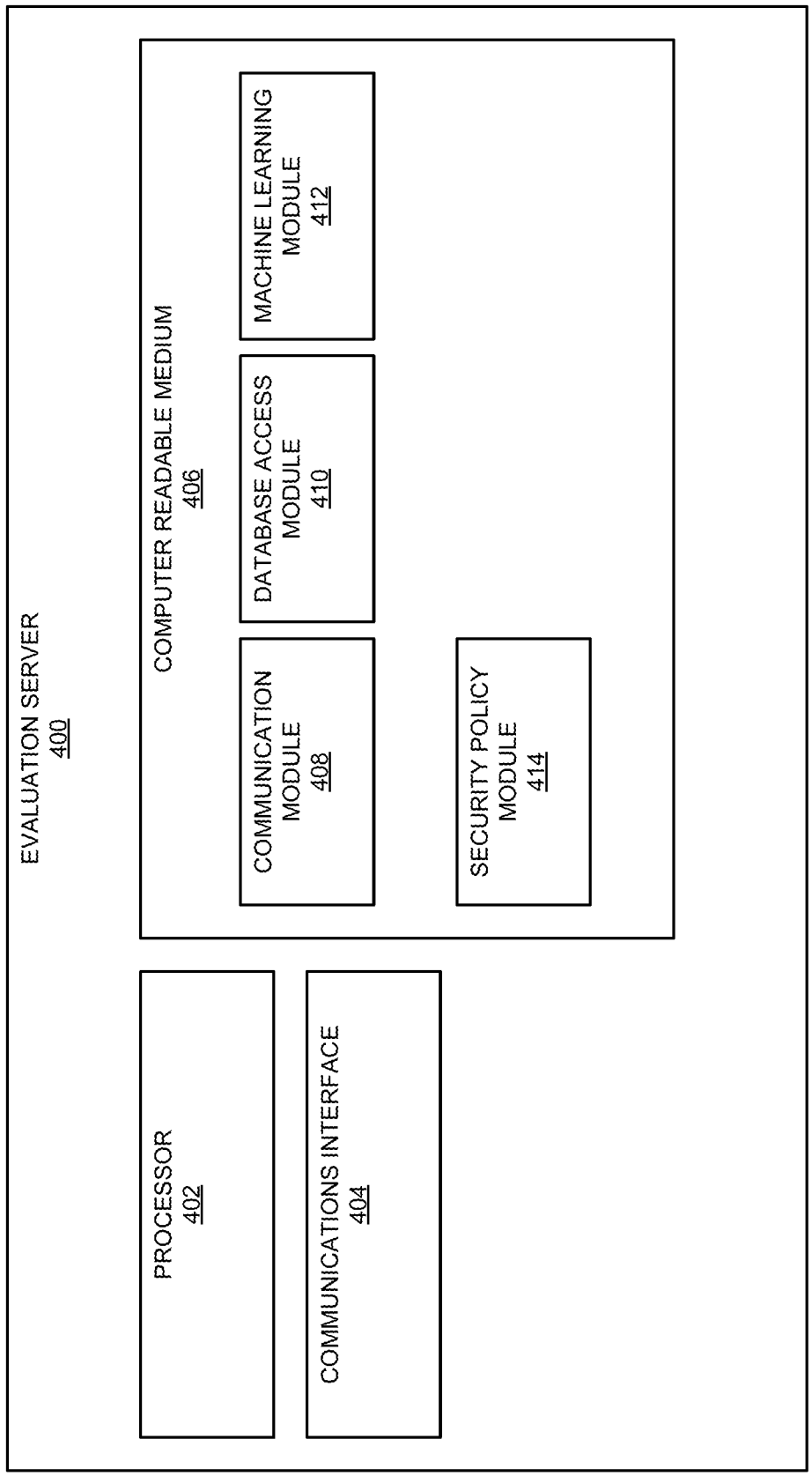
FIG. 4 shows a block diagram of an evaluation server according to some embodiments.

The evaluation servers 110, 112, and 114 may be better understood with reference to FIG. 4, which shows an evaluation server 400 comprising a processor 402, communications interface 404, and computer readable medium 406. Computer readable medium 406 may store software modules including a communications module 408, a database access module 410, a machine learning module 412 and a security policy module 414.

Processor 402 may be any suitable processing apparatus or device as described in the terms section above. The communication interface 404 may comprise a network interface that enables the evaluation service 400 to communicate with other computers or systems, including microservice hosts and microservice orchestrators over a network such as the Internet.

Communication module 408 may comprise code or software, executable by the processor 402 for establishing communications between the evaluation server and other entities, including microservice hosts and microservice orchestrators. The evaluation service may use the communication module 408 to receive data from the microservice host, including system level activity data and metadata. The evaluation server 400 may additionally use the communication module 408 to transmit security policies or control instructions to microservice hosts and orchestrators, including instructions to pause or terminate microservices.

Database access module 410 may comprise code or software, executable by the processor 402, for accessing databases, such as databases 104, 106, and 108 from FIG. 1. The evaluation server may access these databases in order to store or retrieve machine learning models corresponding to microservices operating on a microservice host. The evaluation server 400 may also access these databases in order to store or receive system level activity data for use as training data or for forensic analysis by security teams.

Machine learning module 412 may comprise code or software, executable by the processor 402 for training and using machine learning models corresponding to microservices operating on microservice hosts. These may include any appropriate machine learning models, including supervised and unsupervised machine learning models. Examples of machine learning models include isolation forest, one-class support vector machine, logistic regression, neural networks, etc. The machine learning module 412 may additionally comprise code, executable by the processor 412 for processing system level activity data in order to generate feature vectors that may be applied as inputs to the machine learning models. The machine learning models may be used to classify or otherwise label system level activity data as either normal or abnormal.

Security policy module 414 may comprise code or other software, executable by the processor 402 for generating security policies. This may include code for generating security policies for individual microservices based on corresponding machine learning models. For example, the security policy module 414 may comprise code, executable by the processor for generating a security policy configuration file that permits normal system level activities and denies abnormal system level activities. The security policy module 414 may also comprise code enabling the processor 402 to package security policies or security policy files such that they can be transmitted to other computer systems over networks such as the Internet.

Returning to FIG. 1, microservice orchestrators 130, 132, and 134 may store, manage, and distribute microservices or microservice images to microservice hosts 118, 120, and 122. Additionally, microservice orchestrators 130, 132, and 134 may apply or update security policies for microservice images. Each microservice orchestrator 130, 132, and 134 may manage a microservice image repository, a database comprising microservice images and associated information, such as a microservice owner 140 associated with the microservice image, a microservice image identifier, or a security team in charge of the microservice image.

It should be understood that although three microservice hosts 118, 120, and 122 are shown, embodiments of the present disclosure can be practiced with any number of microservice hosts. Similarly, there may be any number of microservices, databases, evaluation services, orchestrators, etc. In some embodiments, the microservice evaluator 102 may comprise a single evaluation server, rather than a collection of evaluator servers and a load balancer 116. Further, in some embodiments, the microservice evaluator 102 and microservice orchestrators 130, 132, and 134 may be present within a same computer system.

Other entities 138 may include microservice owners or developers 140, security teams 142, and attackers 144. Microservice owners or developers 140 may develop and deploy microservices 126 and 128 to the microservice orchestrators 130, 132, and 134, before those microservices are pushed to microservice hosts 118, 120, and 122. Security teams 138 may verify security policies and perform security forensics or other human triaging. Attackers 144 may attempt to compromise microservices 126 and 128, or microservice hosts 118, 120, and 122 in order to perform a denial of service attack or extract sensitive information.

Generally, microservice deployment is as follows: A microservice developer or owner 140 develops a microservice and uploads or otherwise transmits the microservice image to a microservice orchestrator 134, which stores the microservice image in a microservice image repository 136. The microservice image may include a configuration file with a default security policy. In some embodiments, the default security policy may be developed by the microservice owner 140, in other embodiments, the microservice orchestrator 134 may automatically assign a default security policy. The default security policy may indicate the capabilities associated with a microservice, as well as a default list of allowed and disallowed system calls or commands. The default security policy may be designed by a subject matter expert.

Alternatively, the microservice orchestrators 130, 132, and 134 and microservice evaluator 102 may base the default security policy for a new microservice off a hardened security policy for a similar microservice. As an example, a database management microservice may perform system level activities that are generally similar to previously generated database management microservices. As such, the hardened security policies for a previously generated database management microservice may be applied as the default security policy for a newly generated database management microservice.

Figure 5:
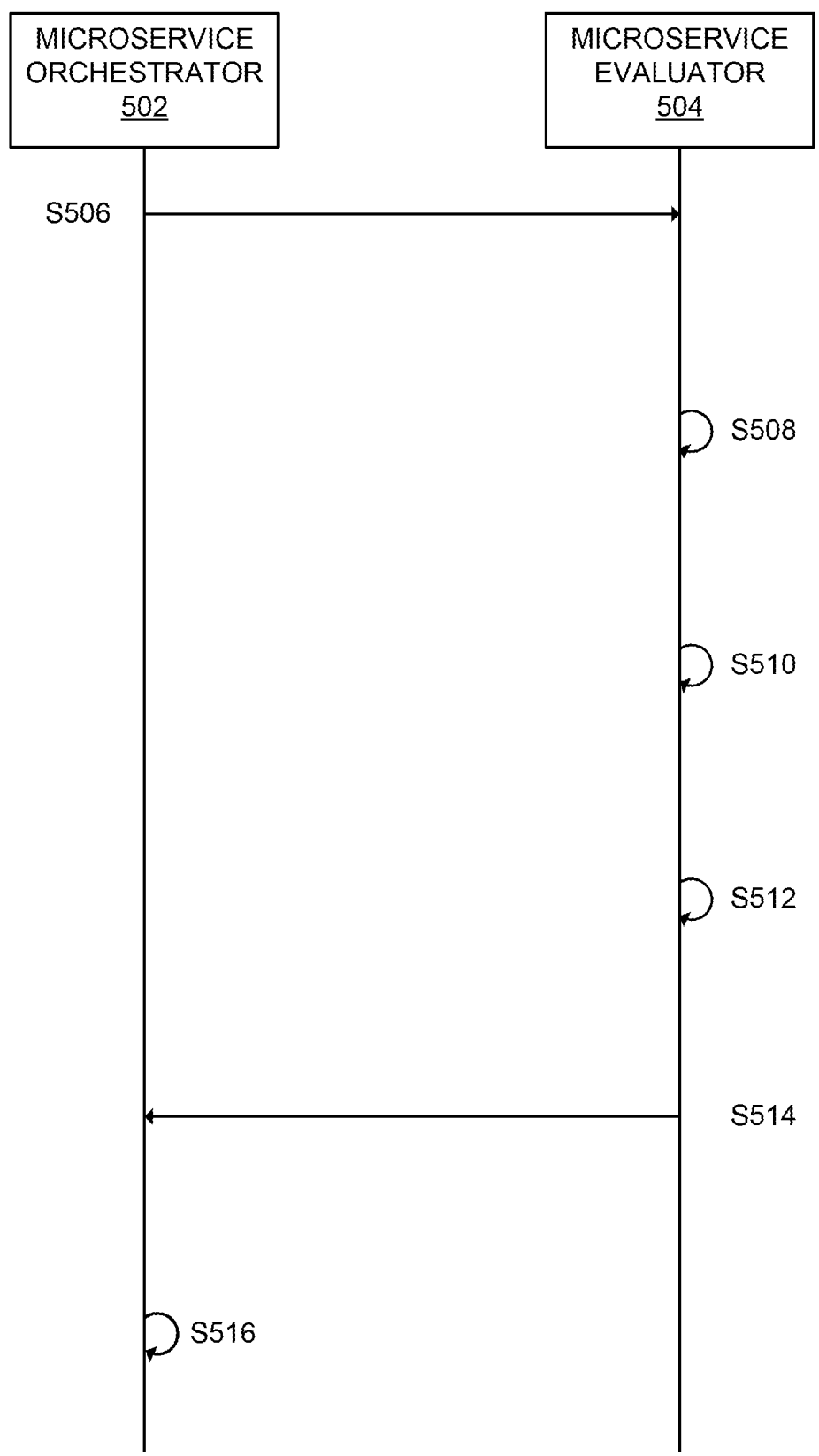
FIG. 5 shows a sequence diagram of a method of generating security policies based off existing security policies according to some embodiments.

FIG. 5 shows an exemplary method by which a hardened security policy associated with a second microservice can be "cloned" and applied to a newly generated first microservice, according to some embodiments.

At step S506, a microservice evaluator 504 can receive first metadata corresponding to the first microservice from the microservice orchestrator 502. This metadata can include information about the first microservice, including tags (e.g., "database management," "video encoding," "generated on 10-10-2017," etc.) The metadata may also include information such as the raw data corresponding to the first microservice or a first microservice image, or a hash of the data corresponding to the first microservice.

At step S508, the microservice evaluator 504 can identify a second microservice. The microservice evaluator 504 can identify the second microservice using the first metadata. For example, the microservice evaluator 504 can query a database using tags included in the first metadata. The second microservice may be a microservice that is similar to the first microservice, e.g., the second microservice may perform similar functions to the first microservice. The second microservice may have already have a hardened security policy previously generated by microservice evaluator 504, and the hardened security policy may be applicable to the first microservice. The microservice evaluator 504 may additionally determine second metadata corresponding to the second microservice. The microservice evaluator 504 may derive this second metadata from the second microservice, or for example, may retrieve the second metadata from an associated record in a database.

At step S510, the microservice evaluator 504 can determine a distance metric corresponding to the difference between the first metadata corresponding to the first microservice and second metadata corresponding to the second microservice. This distance metric may be used to determine how similar the two microservices are. As an example, if the first metadata and second metadata comprise a number of tags, the distance metric may be equal to a proportion of matching tags between the two microservices. As another example, if the first metadata and second metadata correspond to binary executable files, the distance metric may be equal to the Hamming distance between the two binary executable files.

Figure 6:
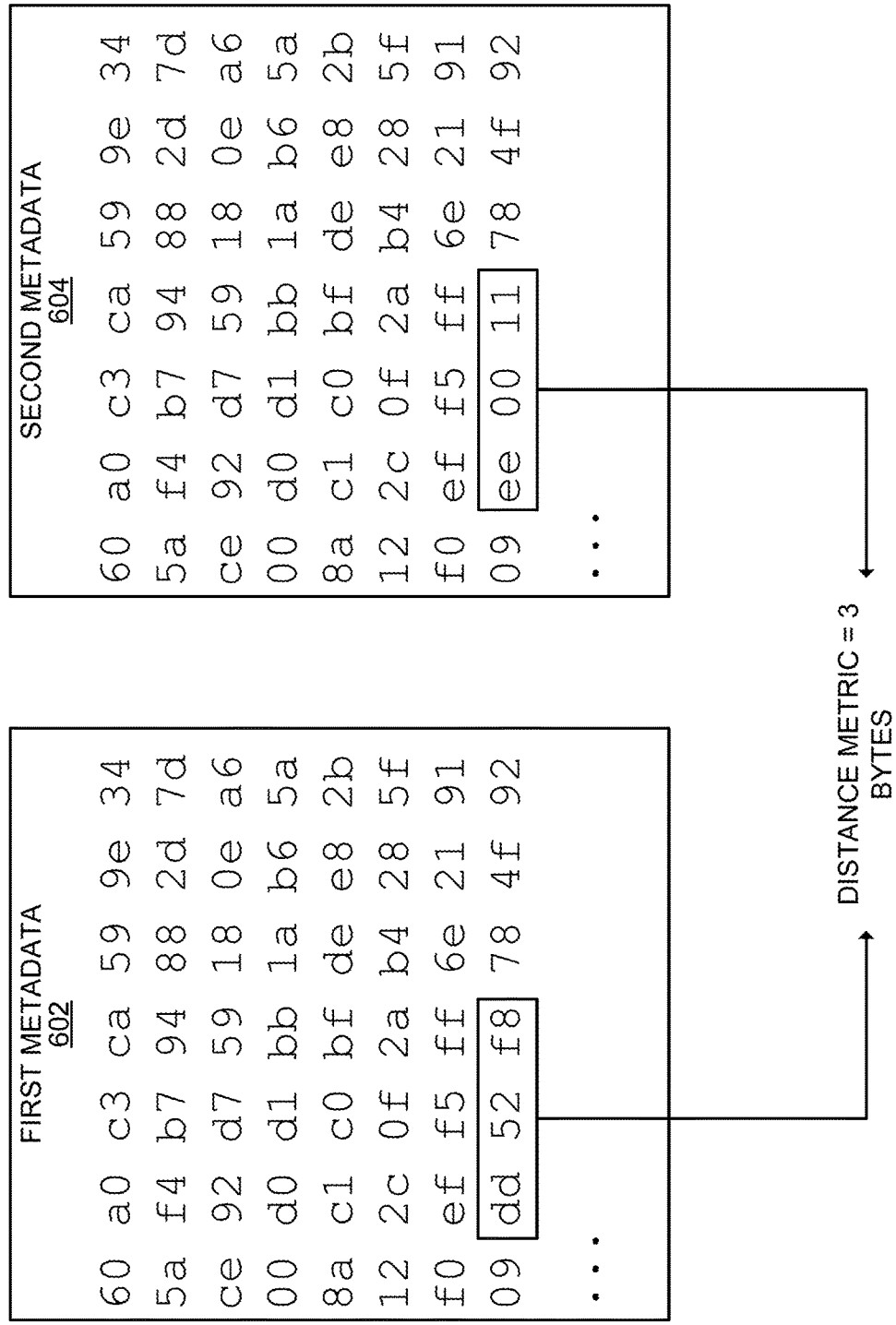
FIG. 6 shows an example of calculating a distance metric according to some embodiments.

FIG. 6 shows an exemplary comparison of metadata as part of determining a distance metric. Exemplary raw data files corresponding to the first metadata 602 and the second metadata 604 are shown. The raw data are identical except for three bytes. The microservice evaluator can sequentially parse and compare each byte of data in first metadata 602 and second metadata 604 and identify any bytes that do not match. The distance metric between the first metadata 602 and second metadata 604 may be the total number of non-matching bytes, in this example, three bytes.

Returning to FIG. 5, at step S512, the microservice evaluator 504 can compare the distance metric against a distance threshold. The distance threshold may indicate the extent that the first metadata and second metadata must be similar before being considered a match. The distance threshold may be static and predetermined or determined dynamically.

If the microservice evaluator 504 determines that the distance metric is less than a distance threshold, at step S514, the microservice evaluator 504 can transmit a second security policy corresponding to the second microservice to the microservice orchestrator 502. The second security policy may be a hardened security generated by the microservice evaluator 504 at a previous time.

At step S516, the microservice orchestrator 502 may apply the second security policy as a default security policy to the first microservice or an image of the first microservice. The microservice orchestrator 502 may, for example, generate a configuration file including the default security policy and include it in the first microservice image stored in a microservice image repository.

It should be understood that in some embodiments of the invention, one or more steps may be performed by the microservice orchestrator 502 without the microservice evaluator 504. In some embodiments, the microservice orchestrator 502 may perform all steps. Instead of, for example, transmitting the first metadata to the microservice evaluator 504, which subsequently determines the distance metric, the microservice orchestrator 502 may identify one or more second microservices in the microservice repository (i.e., microservice repository 136 from FIG. 1) and determine distance metrics corresponding to each of those microservices. The microservice orchestrator 502 may select the security policy corresponding to the microservice with the lowest distance metric, or a distance metric less than the distance threshold.

Once a microservice image has been successfully stored in the microservice image repository, the microservice image may be pushed to a microservice host in order to be executed by that microservice host.

Once a microservice is deployed onto a microservice host, the microservice host can begin monitoring system level activities performed by the microservice. In some embodiments, the microservice host may initially deploy the microservice into an application sandbox, or other protected execution environment. An application sandbox may allow the microservice to operate in isolated conditions. This may allow the microservice host to verify that the microservice is legitimate (i.e., not developed by an attacker or other malicious user) before allowing it greater access to the microservice host. The microservice host may additionally enforce the default security policy (if applicable) using a security module such as AppArmor or SELinux.

Figure 7:
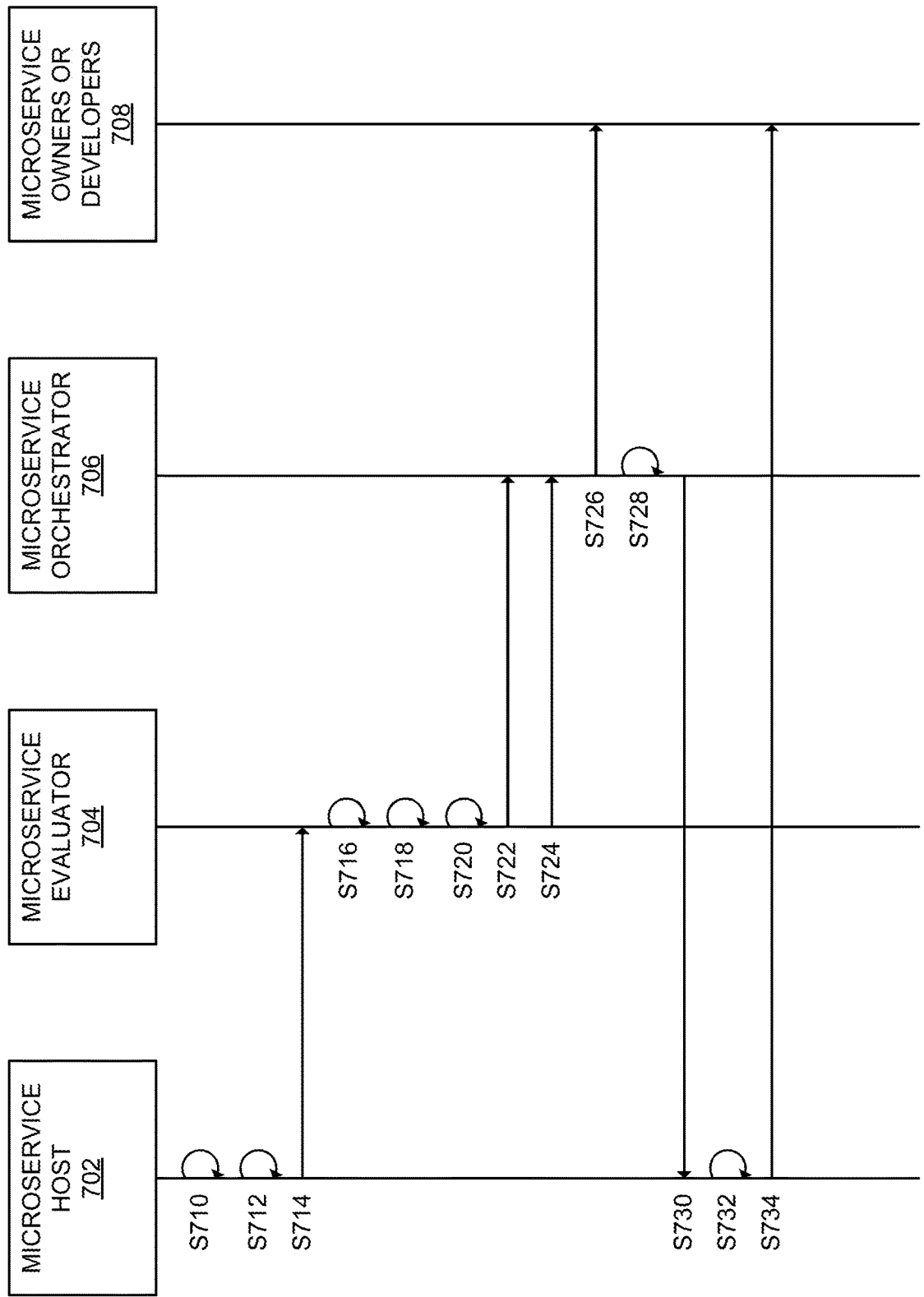
FIG. 7 shows a sequence diagram of a method of training machine learning models and generating security policies for microservices according to some embodiments.

As stated above, one function of embodiments of the present disclosure is generating hardened security policies based on system calls made by microservices operating on a microservice host. FIG. 7 shows an exemplary method of security policy hardening according to some embodiments of the present disclosure.

At step S710, microservice host 702 can operate a plurality of microservices, the plurality of microservices performing a plurality of system level activities including generating a plurality of system calls to an operating system kernel of the microservice host 702. These system level activities may correspond to the functions of each of the plurality of microservices. For example, a microservice associated with password authentication may perform "read" system calls in order to read a password or the hash of a password received from a client computer. The exemplary password authentication microservice may perform additional "read" system calls in order to read a hashed password stored in memory in order to compare the two passwords for password verification. Microservices may operate in separate, isolated software containers, and may communicate over well-defined channels in order to implement a service, e.g., an image hosting service, transaction authorization service, video streaming service, etc.

Figure 8:
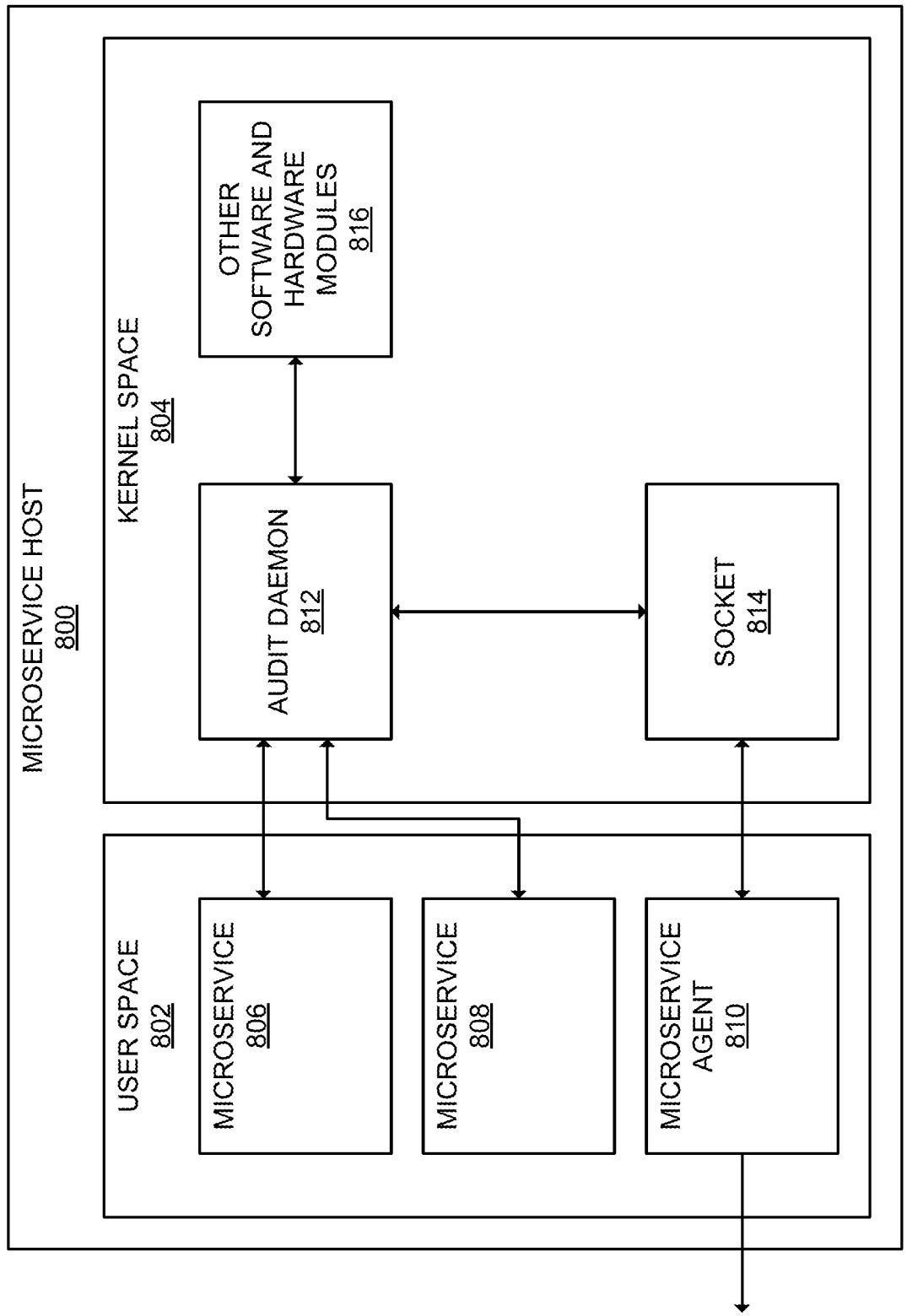
FIG. 8 shows a diagram of a microservice host divided into user space and kernel space according to some embodiments.

At step S712, the microservice host 702 can generate system level activity data from the plurality of system level activities. This system level activity data may include system call data comprising the plurality of system calls or derivatives thereof. In some embodiments, the system level activity data may comprise a plurality of system call audit logs, and may be generated by a microservice agent operating on the microservice host 702. The microservice host 702 can generate the system level activity data by monitoring the system level activities of the microservices. FIG. 8 shows an example of a microservice host 800 configuration that may be used to monitor the operation of the microservices according to some embodiments.

FIG. 8 shows a diagram of a microservice host 800 divided into user space 802 and kernel space 804. Operating in user space 802 are two microservices 806 and 808, and microservice agent 810. The kernel space 804 comprises an audit daemon 812, socket 814, and other software and hardware modules 816 (e.g., hard disk drive, process scheduling, etc.)

System calls and commands made by microservices 806 and 808 can be intercepted by audit daemon 812. The audit daemon 812 can record details about the system level activity data, such as which system calls and commands are made and the time at which the system calls or commands are made, etc. After capturing operational details, the audit daemon 812 passes the system calls or commands to the other hardware and software modules 816. The other software and hardware modules 816 pass the results of the system calls or commands back to the audit daemon 812, which captures and passes the results back to microservices 806 and 808.

The audit daemon 812 can communicate through socket 814 to microservice agent 810, which can record the system level activity data, including system call data in a log file or other suitable file. Microservice agent 810 can thereafter transmit the system level activity data to the microservice evaluator.

Figure 9:
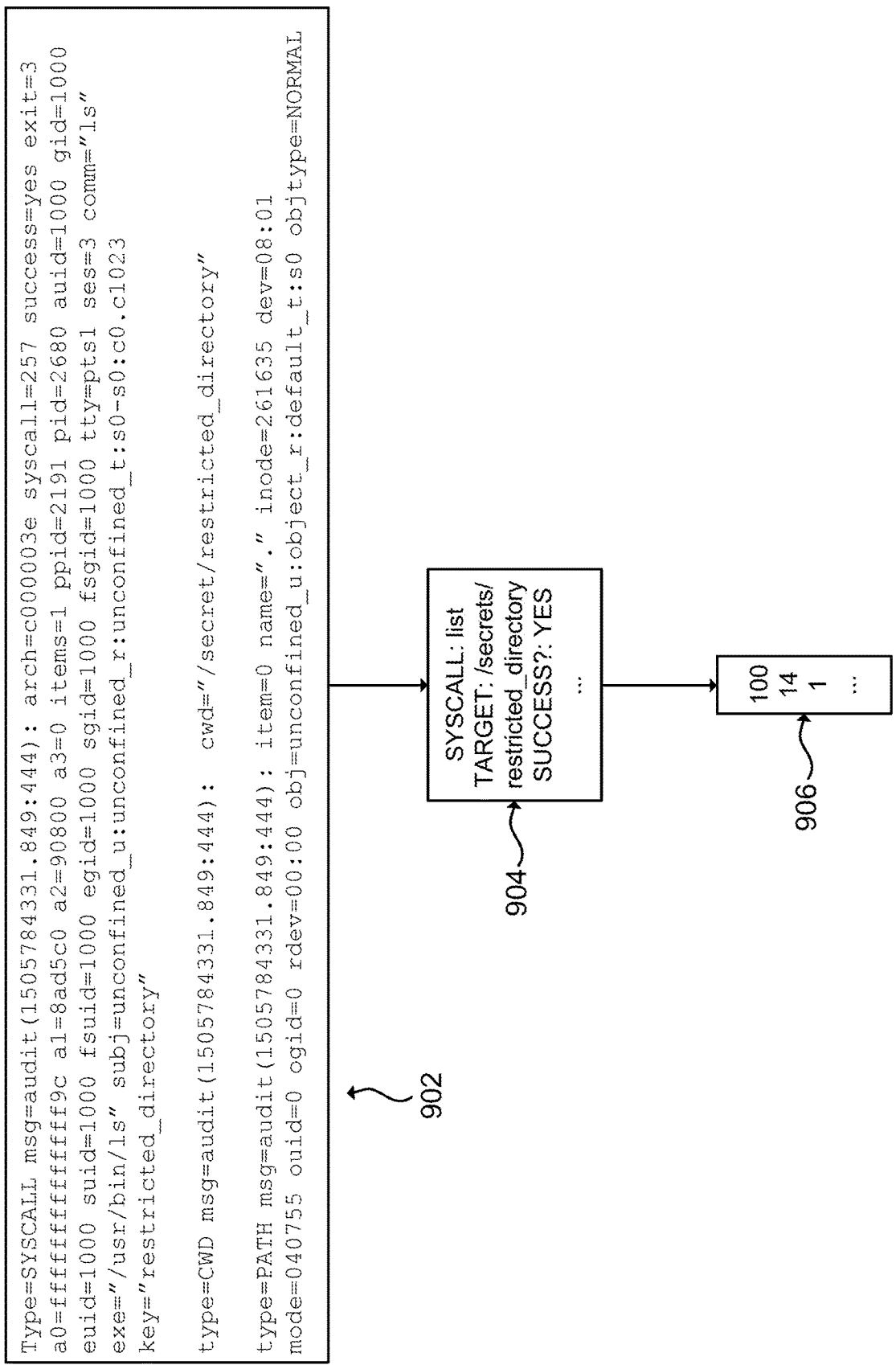
FIG. 9 shows examples of different forms of system call data according to some embodiments.

FIG. 9 shows some examples of system call data according to some embodiments. 902 shows an example of system call data in the form of a log entry. The log entry indicates that the system call "ls" was successfully executed on directory "/secrets/restricted_directory". In UNIX and UNIX-like operating systems, "ls" is the list system call, listing the contents of the directory. List is a command that may be performed by attackers looking to perform reconnaissance on a system, for example, in order to find the location of secret keys or sensitive data stored in a file system.

In some embodiments, the microservice host or microservice agent may process the system call data before transmitting it to the microservice evaluator. This may be advantageous because often system calls in an audit log are interleaved or arrive out of order. 904 shows an example of a more succinct packet of system call data, indicating the system call made, the target, and whether it was successful. 906 shows system call data vector represented as a numerical vector. In some embodiments, this vector may further be normalized, and may be used as a feature vector for a machine learning model stored on the microservice evaluator.

Returning to FIG. 7, at step S714, the microservice host 702 can transmit the system level activity data to the microservice evaluator 704. The microservice evaluator 704 can thereafter evaluate the system level activity data to identify normal system level activities and abnormal system level activities and generate a plurality of security policies corresponding to the plurality of microservices. In some embodiments, the communications between the microservice evaluator 704 and microservice host 702 can be encrypted and mutually authenticated (e.g., using the Transport Layer Security protocol).

At step S716, the microservice evaluator 704 can train a plurality of machine learning models corresponding to the plurality of microservices using the system level activity data or a derivative thereof as training data. The microservice evaluator 704 may train the machine learning models to classify system level activities (including system calls and commands) from the system level activity data as either normal or abnormal. Normal system level activities may include system level activities that occur frequently during normal execution of the microservices, while abnormal system level activities may include system level activities that do not occur frequently, or are potentially hazardous. The microservice evaluator 704 may use any appropriate supervised or unsupervised machine learning model, including, as examples, one-class support vector machines and k-means clustering.

The plurality of machine learning models may each correspond to a particular microservice of the plurality of microservices operating on the microservice host. In this way, the microservice evaluator 704 can identify normal and abnormal system level activities corresponding to each microservice. The microservice evaluator 704 may distinguish between microservices using metadata, for example, the system level activity data may include microservice identifiers that can be used to identify microservices or their images. The microservice evaluator 704 may parse each microservice identifier and determine if a machine learning model that corresponds to that microservice exists. The microservice evaluator 704 can verify the existence of a corresponding machine learning model by querying a machine learning model database using the microservice identifier or other metadata. The machine learning model database may store records or instances of machine learning models organized in relation to the microservice identifiers or other features. If a machine learning model corresponding to a particular microservice does not exist, the microservice evaluator 704 can generate a new record in the database and begin training a machine learning model corresponding to that microservice.

Each machine learning model may be trained with the system level activity data corresponding to the associated microservice. In some embodiments, the system level activity data may be used to train the machine learning model directly, i.e., it is received from the microservice agent in the form of feature vectors or other training data. In other embodiments, the microservice evaluator 704 may process the system level activity data in order to generate feature vectors or other training data, e.g., as explained above with reference to FIG. 9.

The machine learning models may be trained to classify system level activities as either normal or abnormal. The machine learning models may take into account any number of features associated with system level activities in order to identify an operation as either normal or abnormal. For example, the type of system level activities performed, whether it was successful, exit codes, elapsed time between successive system level activities, sequences or combinations of system level activities, the frequency of system level activities, etc., as well as any number of statistics or derived values (e.g., an average success rate of a particular system call or command, etc.).

At step S718, once the machine learning models have been trained, the microservice evaluator 704 may determine a plurality of sets of normal system level activities and abnormal system level activities using the plurality of machine learning models corresponding to the plurality of microservices and the system level activity data. Each set of normal and abnormal system level activities may correspond to a microservice of the plurality of microservices. The sets of normal and abnormal system level activities may be different for each microservice. For example, frequent "read" and "write" system calls may be normal for a database management microservice, but may be abnormal for a microservice used to encode videos streams. The microservice evaluator 704 may parse through the system level activity data and classify each operation from the system level activity data using the correct machine learning model, then associate each classified operation with a dataset corresponding to its corresponding microservice.

At step S720, the microservice evaluator 704 can determine a plurality of security policies corresponding to the plurality of microservices, wherein each security policy comprises a plurality of permitted system level activities and a plurality of non-permitted system level activities. The security policies may additionally comprise a plurality of permitted capabilities and a plurality of non-permitted capabilities. In some embodiments, the plurality of permitted system level activities may correspond to the normal system level activities determined in the previous step, and the plurality of non-permitted system level activities may correspond to the abnormal system level activities determined in the previous step.

The security policies may have any appropriate form, which may depend on the particular security modules used by the microservice hosts (e.g., AppArmor or SELinux in Linux systems). The security profiles may take the form of sequential lists of allowed and disallowed system level activities (e.g., as in FIG. 11) and make take the form of a human readable document listing the allowed and disallowed system level activities. The security profile may be written in a markup language or other appropriate code format. For example, the security profile may comprise lines of code such as "deny @{HOME}/secret/ rw", indicating that read and write ("rw") are non-permitted system calls in the "secrets" directory. As another example, the security profile may include lines of text such as "allow @{HOME}/ not_secrets/ r" indicating that read system calls are permitted in the "not_secrets" directory. The microservice evaluator 704 may store the security policies in a database in association with the corresponding machine learning models. The microservice evaluator 704 may also indicate the association between a particular security policy and its corresponding microservice in the security policy itself, for example, via a tag or header in a security policy file or security policy configuration file. The tag or header may contain metadata such as a microservice identifier in order to indicate the associated microservice.

In some embodiments the plurality of security policies may be a plurality of updated security policies. None, some, or all of the plurality of microservices may already have an associated security policies, such as a default security policy applied to the microservice when it was developed, stored in the microservice image repository on the microservice orchestrator 706, or pushed to the microservice host 702. In some embodiments, the system level activity data transmitted from the microservice host 702 to the microservice evaluator 704 via the microservice agent may contain a copies or records of the security policies corresponding to that particular microservice. In other embodiments, the microservice evaluator 704 may determine the corresponding security policies using metadata (e.g., microservice identifiers) included in the system level activity data. The microservice evaluator 704 may retrieve the security policies itself (e.g., from a database managed by the microservice evaluator 704), or may request and receive a plurality of default (or otherwise) security policies from the microservice host 702 or microservice orchestrator 706. Instead of generating or otherwise determining the plurality of security policies, the microservice evaluator 704 may update the plurality of default (or otherwise) security policies base on the plurality of sets of normal system level activities and abnormal system level activities. As an example, if the security policies comprise lists of permitted system level activities and non-permitted system level activities, the microservice evaluator 704 may add normal system level activities to the list of permitted system level activities and abnormal system level activities to the list of non-permitted system level activities.

At step S722, the microservice evaluator 704 can provide the plurality of security policies or updated security policies to the microservice orchestrator 706. The security policies may be transmitted in any appropriate form. In some embodiments, the communications between the microservice evaluator 704 and the microservice orchestrator 706 may be encrypted and mutually authenticated.

At optional step S724, the microservice evaluator 704 can transmit an instruction to the microservice orchestrator 704 to identify the microservice owners or developers 708 associated with each microservice. The microservice orchestrator 706 can identify the microservice owners or developers 708 using metadata include in either the instruction or in the plurality of security policies or updated security polices transmitted at step S722. The microservice orchestrator 706 can identify the microservice owners or developers 708 using metadata such as a microservice identifier or owner identifier. In some embodiments, the microservice orchestrator 706 can use the microservice identifier to identify a corresponding record and microservice image included in the microservice image repository, then from the record determine the microservice owner or developer 708 corresponding to that microservice image.

At optional step S726, the microservice orchestrator 706 can transmit one or more messages to one or more microservice owners or developers 708 to indicate a change in one or more security policies of the plurality of security policies. That is, the microservice orchestrator 706 can transmit a message to each microservice owner or developer 708 indicating that a change has been made to a microservice associated with that microservice owner or developer 708. Optionally, the microservice orchestrator 706 may transmit the plurality of security policies to security teams or microservice owners or developers 708 before they are pushed to the microservice host 702. The security teams or microservice owners 708 may review the security policies and perform any manual corrections before they are applied to the plurality of microservices or microservice images.

At step 728, the microservice orchestrator 706 can apply the plurality of security policies to the plurality of microservices. In some embodiments, applying the plurality of security policies for the plurality of microservices may include generating a plurality of updated microservice images corresponding to the plurality of microservices. The microservice orchestrator 706 can generate or replace one or more files or code segments from each of the plurality of microservice images in order to update the plurality of microservice images. As an example, the microservice orchestrator 706 may include a file corresponding to the new security policy in the microservice image, as well as update a configuration file to point to the new security policy.

As another alternative, applying the plurality of security policies to the plurality of microservices may include providing updates or control instructions to the microservice host 702. The microservice orchestrator 706 may transmit instructions or other messages that may indicate new security policies or changes to the security policies. The microservice orchestrator 706 may stream or otherwise push the plurality of security policies to the microservice host 702, using any appropriate communication means.

At step S730, the microservice host 702 can receive the plurality of security policies or a plurality of updated microservice images including the security policies.

At step S732, the microservice host 702 can allow permitted system level activities of the plurality of system level activities and prevent non-permitted system level activities of the plurality of system level activities. There are many conceivable ways in which a security policy may be enforced. For example, the microservice host 702 may use a security module such as AppArmor or SELinux in order to enforce the security policies.

At optional step S734, if a policy failure occurs, e.g., a microservice either attempt to or succeeds in performing a non-permitted operation, the microservice host 702 may notify security teams or microservice owners or developers 708 with information regarding the policy failure and any actions taken, e.g., shutting down or pausing the microservice.

Figure 10:
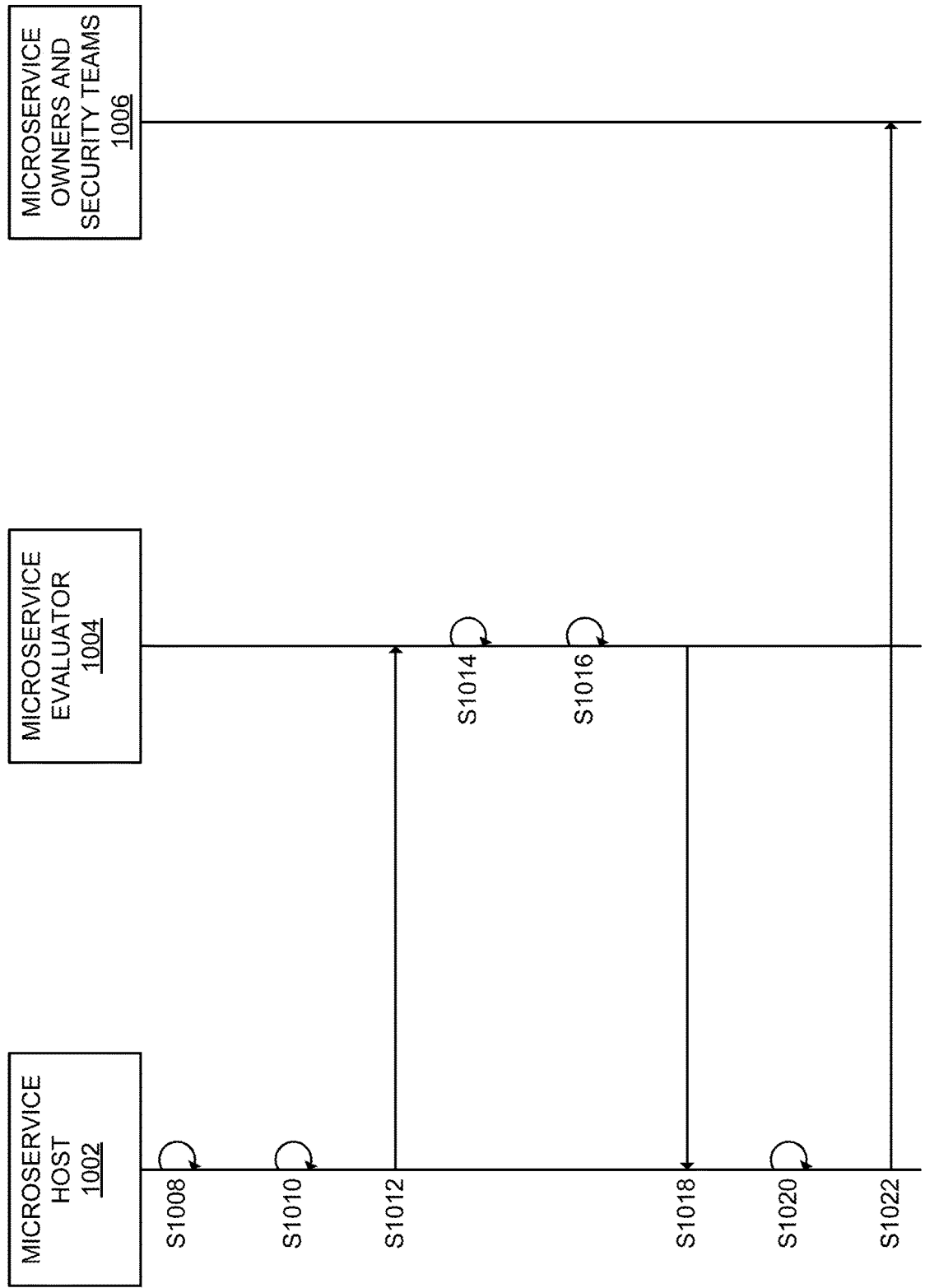
FIG. 10 shows a sequence diagram of a method of using machine learning models to detect anomalous microservice system level activities and pause or terminate microservices according to some embodiments.

In additional to securing microservices and microservice hosts using security policy hardening, embodiments of the present disclosure provide additional security by periodically evaluating system level activities made by microservices using machine learning models. In this way, even if an attacker manages to compromise a microservice and evade the corresponding security policy, anomalous or malicious system level activities can be detected. FIG. 10 shows a sequence diagram of a method of monitoring and evaluating microservice activity according to some embodiments.

At step S1008, the microservice host 1002 can operate a plurality of microservices that perform system level activities including generating a plurality of system calls to the operating system kernel of the microservice host 1002. As stated above, these system level activities may correspond to the functions of each of the plurality of microservices. For example, a microservice associated with password authentication may perform "read" system calls in order to read a password or the hash of a password received from a client computer. The exemplary password authentication microservice may perform additional "read" system calls in order to read a hashed password stored in memory in order to compare the two passwords as part of password verification.

Microservices may operate in separate, isolated software containers and may communicate over well-defined channels in order to implement a service, e.g., an image hosting service, transaction authorization service, video streaming service, etc. The system level activities and system level activity data may be second, third, fourth, etc. system level activities and system level activity data if multiple rounds of system level activities are performed (e.g., one set of system level activities may be performed at one time, and a second set of system level activities may be performed at a future time).

At step S1010, the microservice host 1002 can generate system level activity data comprising the plurality of system level activities or derivatives thereof. As stated above, in some embodiments, the system level activity data may comprise a plurality of audit logs, and may be generated by a microservice agent operating on the microservice host 1002. The microservice host 1002 can generate the system level activity data by monitoring the system level activities of the microservices. This may be accomplished using any appropriate methods, such as the methods described above with reference to FIG. 8. Derivatives thereof may refer to any data directly or indirectly generated by the microservice host 1002 from system level activity data, for example, audit logs or feature vectors as shown in FIG. 9.

At step S1012, the microservice host 1002 can transmit the system level activity data to the microservice evaluator 1004. The microservice evaluator 1004 can thereafter generate a plurality of anomaly scores or a plurality of control instructions using a plurality of machine learning models corresponding to the plurality of microservices and the system level activity data. In some embodiments, the communications between the microservice evaluator 1004 and microservice host 1002 may be encrypted and mutually authenticated (e.g., using the Transport Layer Security protocol).

At step S1014, after receiving the system level activity data from the microservice host 1002, the microservice evaluator 1004 can determine a plurality of machine learning models corresponding to the plurality of microservices using the system level activity data. In some embodiments, the system level activity data may additionally comprise metadata corresponding to the microservices. The microservice evaluator 1004 may use this metadata in order to query a database of machine learning models. In some embodiments, the metadata may include microservice identifiers that uniquely identify each microservice of the plurality of microservices.

At step S1016, the microservice evaluator 1004 may determine whether the system level activity data corresponds to normal or abnormal system level activities using the plurality of machine learning models and the system level activity data or a derivative thereof (e.g., a feature vector as described above). That is, the microservice evaluator 1004 may classify the system level activities comprising the system level activity data as either normal or abnormal system level activities using the machine learning models.

Determining whether the system level activity data corresponds to normal or abnormal system level activities may comprise applying the system level activity data or derivatives of the system level activity data as inputs to the machine learning models. The machine learning models may thereafter produce anomaly scores, indicating the likelihood that a given operation is anomalous. For example, an anomaly score of 10 may indicate that there is only a 10% probability that the corresponding operation is anomalous, while an anomaly score of 100 may indicate that there is a 100% probability that the corresponding operation is anomalous. The microservice evaluator 1004 may compare each of the anomaly scores against an anomaly score threshold, and determine that system level activities are anomalous if the anomaly scores exceed the anomaly score threshold. For example, an anomaly score threshold may be 50, indicating that the microservice evaluator 1004 determines that an operation is anomalous if there is greater than a 50% probability that the operation is abnormal. Conversely, if an anomaly score is less than the anomaly score threshold, the microservice evaluator 1004 may determine that the corresponding operation is normal.

At step S1018, the microservice evaluator 1004 can transmit one or more indications to the microservice host 1002. The indications may indicate whether system level activity data evaluated by the microservice evaluator 1004 correspond to normal system level activities or abnormal system level activities. If the system level activity data corresponds to normal system level activities, the microservice evaluator 1004 may transmit a first indication to the microservice host, indicating that the system level activity data corresponds to normal system level activities, and if the system level activity data corresponds to abnormal system level activities, the microservice evaluator 1004 may transmit a second indication to the microservice host 1002, indicating that the system level activity data corresponds to abnormal system level activities. The indications may also include other data, commands, or instructions that can be used by the microservice host 1002. For example, the microservice evaluator 1004 may transmit the microservice identifiers corresponding to microservices that produce abnormal system level activity data. The microservice evaluator 1004 may also transmit control instructions corresponding to each microservice that produces abnormal system level activity data. These instructions may indicate to the microservice host 1002 whether the microservices producing abnormal system level activities (e.g., system calls or commands) should be paused or terminated.

At step S1020, after receiving the plurality of anomaly scores or plurality of control instructions from the microservice evaluator 1004, the microservice host 1002 can pause or terminate one or more microservices of the plurality of microservices based on the plurality of anomaly scores or the plurality of control instructions. A control instruction may indicate a microservice identifier as well as an action to be taken, such as pausing or terminating the microservice. The microservice host 1002 may identify the microservice corresponding to the microservice identifier and pause or terminate the microservice. Alternatively, the microservice host 1002 may evaluate the received anomaly scores and pause or terminate microservices based on their anomaly score. For example, the microservice host 1002 may terminate all microservices with an anomaly score greater than 90, and pause all microservices with an anomaly score greater than 50 and less than 90. The microservice host 1002 may use the microservice agent in order to pause or terminate microservices.

Optionally, at step S1022, the microservice host 1002 may transmit messages to microservice owners, developers, or security teams 1006 indicating which microservices, if any, were paused or terminated.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
   receiving, by a microservice evaluator, from a microservice host, system level activity data corresponding to a plurality of microservices operating on the microservice host, the microservice evaluator being different from, and communicatively coupled to, the microservice host;
   training, by the microservice evaluator, a plurality of machine learning models using the system level activity data or a derivative thereof as training data, wherein each machine learning model corresponds to a particular microservice of the plurality of microservices operating on the microservice host;
   determining, by the microservice evaluator, using the plurality of machine learning models corresponding to the plurality of microservices and the system level activity data, a plurality of sets of normal system level activities and abnormal system level activities;
   determining, by the microservice evaluator, a plurality of security policies corresponding to the plurality of microservices, wherein each security policy comprises a plurality of permitted system level activities and a plurality of non-permitted system level activities;
   providing, by the microservice evaluator, to a microservice orchestrator, the plurality of security policies, wherein the microservice orchestrator generates one or more configuration files corresponding to the plurality of security policies and deploys the one or more configuration files to the plurality of microservices operating on the microservice host; and
   transmitting, by the microservice evaluator, an instruction to the microservice orchestrator, wherein in response to receiving the instruction, the microservice orchestrator identifies a plurality of microservice owners corresponding to the plurality of microservices and transmits one or more messages to one or more microservice owners of the plurality of microservice owners indicating a change in one or more security policies of the plurality of security policies.

2. The method of claim 1, wherein generating the one or more configuration files includes generating a plurality of updated microservice images corresponding to the plurality of microservices and sending the plurality of updated microservice images to the microservice host.

3. The method of claim 1, wherein the one or more configuration files include information corresponding to providing updates or control instructions to the microservice host.

4. The method of claim 1, wherein the system level activity data includes system call data, command data, and capability data.

5. The method of claim 1, wherein the plurality of permitted system level activities correspond to normal system level activities from the plurality of sets of normal system level activities and abnormal system level activities and the plurality of non-permitted system level activities correspond to abnormal system level activities from the plurality of sets of normal system level activities and abnormal system level activities.

6. The method of claim 1, wherein the plurality of security policies are a plurality of updated security policies, wherein the method further comprises receiving, from the microservice host or the microservice orchestrator, a plurality of default security policies corresponding to the plurality of microservices, and wherein determining the plurality of security policies corresponding to the plurality of microservices comprises updating the plurality of default security policies based on the plurality of sets of normal system level activities and abnormal system level activities.

7. The method of claim 1, wherein the plurality of microservices are implemented using a plurality of software containers or a plurality of virtual machines or a combination thereof.

8. The method of claim 1, further comprising:
   receiving, by the microservice evaluator, from the microservice orchestrator, first metadata corresponding to a first microservice;
   determining, by the microservice evaluator, a distance metric corresponding to a difference between the first metadata and second metadata corresponding to a second microservice;
   determining, by the microservice evaluator, that the distance metric is less than a distance threshold; and
   transmitting, by the microservice evaluator, a second security policy corresponding to the second microservice to the microservice orchestrator, wherein the microservice orchestrator applies the second security policy as a default security policy to the first microservice or an image of the first microservice.

9. The method of claim 1, wherein the system level activity data includes one or more system call audit logs, the method further comprising:
   generating, by the microservice evaluator, a plurality of feature vectors based on the system call audit logs, wherein the plurality of machine learning models are trained using the plurality of feature vectors; and
   storing, by the microservice evaluator, the one or more system call audit logs and feature vectors in a database.

10. A microservice evaluator comprising:
    a processor; and
    a non-transitory computer readable medium coupled to the processor, the non-transitory computer readable medium comprising code, executable by the processor for implementing a method comprising:
    receiving, from a microservice host, system level activity data corresponding to a plurality of microservices operating on the microservice host, the microservice evaluator being different from, and communicatively coupled to, the microservice host;

training a plurality of machine learning models using the system level activity data or a derivative thereof as training data, wherein each machine learning model corresponds to a particular microservice of the plurality of microservices operating on the microservice host;

determining using the plurality of machine learning models corresponding to the plurality of microservices and the system level activity data, a plurality of sets of normal system level activities and abnormal system level activities;

determining a plurality of security policies corresponding to the plurality of microservices, wherein each security policy comprises a plurality of permitted system level activities and a plurality of non-permitted system level activities;

providing to a microservice orchestrator, the plurality of security policies, wherein the microservice orchestrator generates one or more configuration files corresponding to the plurality of security policies and deploys the one or more configuration files to the plurality of microservices operating on the microservice host; and transmitting an instruction to the microservice orchestrator, wherein in response to receiving the instruction, the microservice orchestrator identifies a plurality of microservice owners corresponding to the plurality of microservices and transmits one or more messages to one or more microservice owners of the plurality of microservice owners indicating a change in one or more security policies of the plurality of security policies.

11. The microservice evaluator of claim 10, generating the one or more configuration files includes generating a plurality of updated microservice images corresponding to the plurality of microservices and sending the plurality of updated microservice images to the microservice host.

12. The microservice evaluator of claim 10, wherein the one or more configuration files include information corresponding to providing updates or control instructions to the microservice host.

13. The microservice evaluator of claim 10, wherein the system level activity data includes system call data, command data, and capability data.

14. The microservice evaluator of claim 10, wherein the plurality of permitted system level activities correspond to normal system level activities from the plurality of sets of normal and abnormal system level activities and the plurality of non-permitted system level activities correspond to abnormal system level activities from the plurality of sets of normal and abnormal system level activities.

15. The microservice evaluator of claim 10, wherein the plurality of security policies are a plurality of updated security policies, wherein the method further comprises receiving, from the microservice host or the microservice orchestrator, a plurality of default security policies corresponding to the plurality of microservices, and wherein determining the plurality of security policies corresponding to the plurality of microservices comprises updating the plurality of default security policies based on the plurality of sets of normal system level activities and abnormal system level activities.

16. The microservice evaluator of claim 10, wherein the plurality of microservices are implemented using a plurality of software containers or a plurality of virtual machines or a combination thereof.

17. The microservice evaluator of claim 10, the method further comprising:

receiving first metadata corresponding to a first microservice from the microservice orchestrator;

determining a distance metric corresponding to a difference between the first metadata and second metadata corresponding to a second microservice;

determining that the distance metric is less than a distance threshold; and transmitting, a second security policy corresponding to the second microservice to the microservice orchestrator, wherein the microservice orchestrator applies the second security policy as a default security policy to the first microservice or an image of the first microservice.

18. The microservice evaluator of claim 10, wherein the system level activity data includes one or more system call audit logs, the method further comprising:

generating a plurality of feature vectors based on the system call audit logs, wherein the plurality of machine learning models are trained using the plurality of feature vectors; and storing, by the microservice evaluator, the one or more system call audit logs and feature vectors in a database.

\* \* \* \* \*